US007491435B2

(12) United States Patent
Gervasi et al.

(10) Patent No.: US 7,491,435 B2
(45) Date of Patent: Feb. 17, 2009

(54) PERFLUORINATED POLYETHER RELEASE AGENT FOR FUSER MEMBERS

(75) Inventors: David J. Gervasi, Penfield, NY (US); Bryan J. Roof, Fairport, NY (US); Santokh S. Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 11/444,559

(22) Filed: May 31, 2006

(65) Prior Publication Data

US 2007/0281165 A1 Dec. 6, 2007

(51) Int. Cl.
*B32B 1/08* (2006.01)
*B32B 25/14* (2006.01)
*B32B 25/20* (2006.01)
*G03G 15/20* (2006.01)

(52) U.S. Cl. .................... 428/36.91; 428/421; 428/447; 399/333

(58) Field of Classification Search ....................... None
See application file for complete search history.

(56) References Cited

U.S. PATENT DOCUMENTS

| | | | | |
|---|---|---|---|---|
| 4,430,406 | A | 2/1984 | Newkirk et al. | |
| 5,851,673 | A * | 12/1998 | Chen et al. | 428/421 |
| 6,695,904 | B2 | 2/2004 | Burger et al. | |
| 2007/0110994 | A1* | 5/2007 | Pickering | 428/323 |
| 2007/0277690 | A1 | 12/2007 | Gervasi et al. | |
| 2007/0295287 | A1* | 12/2007 | Band et al. | 122/379 |

FOREIGN PATENT DOCUMENTS

JP 02137876 A * 5/1990

OTHER PUBLICATIONS

English language translation of JP 02-137876, May 1990.*

* cited by examiner

*Primary Examiner*—Ramsey Zacharia
(74) *Attorney, Agent, or Firm*—Annette L. Bade

(57) ABSTRACT

A fuser member having a substrate; an outer layer containing a silicone or fluoropolymer; and a release agent material coating on the outer layer, wherein the release agent material coating includes a perfluorinated polyether having a skeleton of Formulas I or II or mixtures thereof:

$$CF_3-(CF_2CF_2)_m-O-(R_1R_2O)-(R_3R_3O)_n-(R_3O)_p-(CF_2)_q-CF_3 \quad \text{Formula I}$$

wherein $R_1$ is selected from the group consisting of $CF_2$, $CF-CF_3$ and $-NR_4R_5$; $R_2$ is selected from the group consisting of $CF_2$, $CF-CF_3$, and $-NR_4R_5$; $R_3$ is selected from the group consisting of $CF_2$ and $CF_3$; $R_4$ is selected from the group consisting of hydrogen, alkyl group having from about 1 to about 18 carbon atoms, arylalkyl group having from about 7 to about 18 carbon atoms, mercapto, hydride and carbinol functional group; $R_5$ is selected from the group consisting of alkyl having from about 1 to about 20 carbons, and a fluoroalkyl having from about 2 to about 10 carbons; m is a number of 0 or 1; n is a number of from about 0 to about 500; p is a number of from about 0 to about 100; q is a number of 0 or 1; and p+n is a number of from about 180 to about 500; and $$R_1-(CF_2CF_2)_m-O-(R_2R_2O)_n-(R_2O)_p-(CF_2)_q-CF_3-R_1 \quad \text{Formula II}$$

wherein $R_1$ is $CF_3$; $R_2$ is $CF_2$, or $CF-CF_3$; m is a number of 0 or 1; n is a number of from about 0 to about 500; p is a number of from about 0 to about 100; q is a number of 0 or 1; and p+n is a number of from about 180 to about 500.

15 Claims, 1 Drawing Sheet

PERFLUORINATED POLYETHER RELEASE AGENT FOR FUSER MEMBERS

CROSS-REFERENCE TO RELATED APPLICATIONS

Reference is made to co-pending, commonly assigned U.S. patent application Ser. No. 11/445,387, entitled "Perfluorinated Polyether Release Agent for Phase Change Ink Members." The application is hereby incorporated by reference in its entirety.

BACKGROUND

Disclosed herein are fuser members and imaging members useful in electrostatographic reproducing apparatuses, including digital, image on image, and contact electrostatic printing and copying apparatuses; and in ink jet (such as phase change, solid ink, and the like) apparatuses. The fuser members can be used as fuser members, pressure members, transfuse or transfix members, and the like. The imaging members can be imaging, transfix, transfuse, or the like, members useful in ink jet machines. In an embodiment, the release agent is a perfluorinated polyether release agent. In embodiments, the release agent has pendant functional groups. In embodiments, the release agent comprises a functional perfluorinated polyether material and a functional silicone material.

U.S. Pat. No. 6,695,904 teaches use of a perfluoroalkyl polyether as a release agent.

U.S. Pat. No. 4,430,406 teaches use of perfluoroalkyl polyethers as release agents.

Maintaining release surfaces in various marking engine subsystems is approached in a variety of manners, most often by use of release agents. Release agents wet surfaces in marking engines by physical or chemical means, providing a continuous barrier to toner, ink, and additives. The release agent is replenished by release agent management (RAM), drum maintenance (DM) or translating web oiling systems.

The following are shortfalls in performance, and are barriers to increased release life, expansion of high-speed color marking, and reduction of total cost of ownership to customers (TCO). To begin with, chemical and physical interactions between silicone release agents and toner and/or ink constituents leads to insufficient releasability. In addition, higher amounts of fuser release agent on fuser and other surfaces results in contamination to parts of the apparatus.

In some commercial high-speed black and white products, fluorine-substituted silicones have been used as release agents at very low levels (<1 mg/pg) for enhanced performance. For many known marking engines, silicone-based release fluids are used because of their thermal stability and by virtue of the facility for functional side chain addition to silicone fluids used for chemical anchoring to substrates. These fluorine-substituted silicones provide fluids with enhanced resistance to interaction with toner and toner components, but are limited to specific applications and subsystem materials sets.

Fluorinated fluids, due to their non-interactivity with other materials, will allow an overall reduction in oil usage. The non-interactive nature increases their effectiveness as release fluids. In addition, these fluids can be effectively filtered and reused, which is an improvement over silicone fluids. Silicones interact so extensively with toner and wax ingredients, that gelation rates and viscosity increase while residing in the sump. This also contributes to gelation on fuser and other surfaces, contributing to secondary failure modes.

The performance of several end use applications in high-speed color printing is compromised by the residual silicone oil that remains on the surface of the print after fusing. Experience has demonstrated that fluorine-substituted silicone fluids avoid this issue because they diffuse into the paper faster than amine-functional silicone fluids, as they do not bond with paper fibers and fillers. Therefore, non-interactive fluorinated fluids should improve end use performance in printing applications where bookbinding adhesives, overcoat varnishes, and other end use processing is a consideration.

Several marking technologies use functional silicone release fluids in order to aid the wetting of the release surface by chemical means. This functionality is multi-faceted in nature, in that it can fortify the release layer through the chemical attachment of functional groups to the surface, it enables more uniform coverage of the release layer, and it can improve wetting of the release fluids that may not wet/spread as effectively or as quickly as they would without the benefit of functionality. The foremost example of functional release fluids is amine functional silicone, commonly used in conjunction with anodized aluminum, fluoropolymer and fluoroelastomer surfaces. As an example, nonfunctional silicone does not inherently spread or wet a fluoroelastomer surface well at the nominal viscosity and temperature ranges suited to the application. The silicone is easily removed from the surface and its wetting behavior does not allow it to wet as uniformly or tenaciously as is necessary for sustained release performance. When the release fluid fails, ink or toner can then contact the drum or fuser surface, resulting in numerous shortfalls in performance, such as transfer offset failures.

Amine functional silicone consists of a blend of non-functional and functional components. The amine functional component is renewable and replenishable, and can both create and bond with unsaturation in polymer backbones. This enables the spread and release performance of the non-functional component, which spreads and remains by virtue of chain entanglement and affinity between the functional and non-functional parts.

Analogous to the previously described situation is the use of functional perfluorinated polyether (PFPE) or other fully fluorinated fluids as release agents. Two main issues in direct and xerographic marking are fuser offset and system reliability. The defects and maintenance requirements associated with these failure modes when used with silicone oil necessitate increased user intervention, increased cost of operation, and more complex system designs. The root cause of many failures in marking systems requiring release agents is the interaction and solubility between toner and ink constituents and the silicone release agent. This interaction and its effects on system performance have been extensively studied and mapped. The use of non-interactive PFPE fluids as release agents in these marking technologies can eliminate these interactions and provide a renewable, through effective filtration, release agent to improve subsystem life and reliability, thereby reducing maintenance and run costs.

There exists a need for a release agent to be used in color marking applications where higher speed, improved release life, and/or cost reduction is desirable. While these fluorinated fluids may be used in their currently commercially available configuration, without additional functionality, more demanding applications may warrant the use of functionalized versions of fluorinated fluids. Such functional molecules are known and can be prepared in a manner described in the following article: Tonelli Claudio, Gavezotti Piero and Strepparola Ezio. Linear perfluoropolyether difunctional oligomers: chemistry, properties and applications Journal of Fluorine Chemistry, Volume 95, Issues 1-2, 4 Jun. 1999, Pages 51-70.

In addition, a need still exists for a release agent, which provides sufficient wetting of the fuser member, but still has little or no interaction with copy substrates such as paper, so that the release agent does not interfere with adhesives and POST-IT® notes (by 3M) adhering to the copy substrate such as paper. It is further desired that the oil not prevent ink or toner adhesion to the final copy substrate. In addition, it is desired that the release agent not react with components of the toner or ink, nor promote fuser fluid gelation. Also, it is desired to provide a release agent that enables increase in life of the fuser member by improved spreading of the release agent.

SUMMARY

Embodiments of the present invention include: a fuser member comprising i) a substrate; ii) an outer layer comprising a silicone or fluoropolymer; and iii) a release agent material coating on the outer layer, wherein the release agent material coating comprises a perfluorinated polyether having a skeleton selected from the group consisting of Formulas I and II and mixtures thereof:

$$CF_3—(CF_2CF_2)_m—O—(R_1R_2O)—(R_3R_3O)_n—(R_3O)_p—(CF_2)_q—CF_3 \quad \text{Formula I}$$

wherein $R_1$ is selected from the group consisting of $CF_2$, $CF—CF_3$ and $—NR_4R_5$; $R_2$ is selected from the group consisting of $CF_2$, $CF—CF_3$, and $—NR_4R_5$; $R_3$ is selected from the group consisting of $CF_2$ and $CF_3$; $R_4$ is selected from the group consisting of hydrogen, alkyl group having from about 1 to about 18 carbon atoms, arylalkyl group having from about 7 to about 18 carbon atoms, mercapto, hydride and carbinol functional group; $R_5$ is selected from the group consisting of alkyl having from about 1 to about 20 carbons, and a fluoroalkyl having from about 2 to about 10 carbons; m is a number of 0 or 1; n is a number of from about 0 to about 500; p is a number of from about 0 to about 100; and q is a number of 0 or 1; and $$R_1—(CF_2CF_2)_m—O—(R_2R_2O)_n—(R_2O)_p—(CF_2)_q—CF_2—R_1 \quad \text{Formula II}$$

wherein $R_1$ is $CF_3$; $R_2$ is selected from the group consisting of $CF_2$ and $CF—CF_3$; m is a number of 0 or 1; n is a number of from about 0 to about 500; p is a number of from about 0 to about 100; and q is a number of 0 or 1.

Embodiments also include: a fuser member comprising a substrate; an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a perfluorinated polyether having a skeleton selected from the group consisting of Formulas I and II and mixtures thereof:

$$CF_3—(CF_2CF_2)_m—O—(R_1R_2O)—(R_3R_3O)_n—(R_3O)_p—(CF_2)_q—CF_3 \quad \text{Formula I}$$

wherein $R_1$ is selected from the group consisting of $CF_2$, $CF—CF_3$ and $—NR_4R_5$; $R_2$ is selected from the group consisting of $CF_2$, $CF—CF_3$, and $—NR_4R_5$; $R_3$ is selected from the group consisting of $CF_2$ and $CF_3$; $R_4$ is selected from the group consisting of hydrogen, alkyl group having from about 1 to about 18 carbon atoms, arylalkyl group having from about 7 to about 18 carbon atoms, mercapto, hydride and carbinol functional group; $R_5$ is selected from the group consisting of alkyl having from about 1 to about 20 carbons, and a fluoroalkyl having from about 2 to about 10 carbons; m is a number of 0 or 1; n is a number of from about 0 to about 500; p is a number of from about 0 to about 100; and q is a number of 0 or 1; and $$R_1—(CF_2CF_2)_m—O—(R_2R_2O)_n—(R_2O)_p—(CF_2)_q—CF_2—R_1 \quad \text{Formula II}$$

wherein $R_1$ is $CF_3$; $R_2$ is selected from the group consisting of $CF_2$ and $CF—CF_3$; m is a number of 0 or 1; n is a number of from about 0 to about 500; p is a number of from about 0 to about 100; and q is a number of 0 or 1.

In addition, embodiments include: an image forming apparatus for forming images on a recording medium comprising a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises a) a substrate; b) an outer layer comprising a fluoroelastomer selected from the group consisting of i) copolymers of two of vinylidene fluoride, hexafluoropropylene and tetrafluoroethylene; ii) terpolymers of vinylidene fluoride, hexafluoropropylene and tetrafluoroethylene; and iii) tetrapolymers of vinylidene fluoride, hexafluoropropylene, tetrafluoroethylene, and a cure site monomer; and a release agent material coating on the outer layer, wherein the release agent material coating comprises a perfluorinated polyether having a skeleton selected from the group consisting of Formulas I and II and mixtures thereof:

$$CF_3—(CF_2CF_2)_m—O—(R_1R_2O)—(R_3R_3O)_n—(R_3O)_p—(CF_2)_q—CF_3 \quad \text{Formula I}$$

wherein $R_1$ is selected from the group consisting of $CF_2$, $CF—CF_3$ and $—NR_4R_5$; $R_2$ is selected from the group consisting of $CF_2$, $CF—CF_3$, and $—NR_4R_5$; $R_3$ is selected from the group consisting of $CF_2$ and $CF_3$; $R_4$ is selected from the group consisting of hydrogen, alkyl group having from about 1 to about 18 carbon atoms, arylalkyl group having from about 7 to about 18 carbon atoms, mercapto, hydride and carbinol functional group; $R_5$ is selected from the group consisting of alkyl having from about 1 to about 20 carbons, and a fluoroalkyl having from about 2 to about 10 carbons; m is a number of 0 or 1; n is a number of from about 0 to about 500; p is a number of from about 0 to about 100; and q is a number of 0 or 1; and $$R_1—(CF_2CF_2)_m—O—(R_2R_2O)_n—(R_2O)_p—(CF_2)_q—CF_2—R_1 \quad \text{Formula II}$$

wherein $R_1$ is $CF_3$; $R_2$ is selected from the group consisting of $CF_2$ and $CF—CF_3$; m is a number of 0 or 1; n is a number of from about 0 to about 500; p is a number of from about 0 to about 100; and q is a number of 0 or 1.

BRIEF DESCRIPTION OF THE DRAWINGS

For a better understanding of the present invention, reference may be had to the accompanying figures.

DETAILED DESCRIPTION

Disclosed herein are fuser agents, release agents, fuser oils, and the like, comprising perfluorinated polyethers. The fuser agents are useful with toner-based printing and copying apparatuses, and with ink (such as solid ink)-based printing apparatuses. Specifically, the release agent comprises a perfluorinated polyether (PFPE) fluid to improve the wettability of PFPE on a variety of surfaces. A concentrated functional fluid can also be blended with a non-functional PFPE to be used in a variety of release agent applications.

Figure 1:
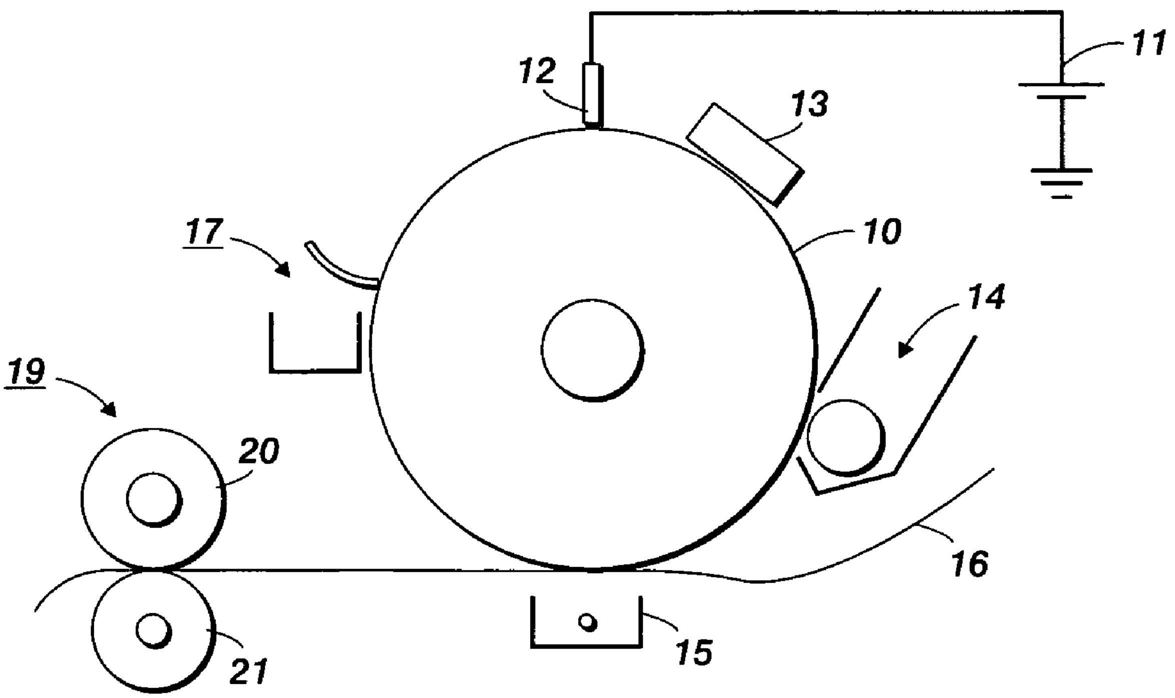
FIG. 1 is a schematic illustration of an image apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
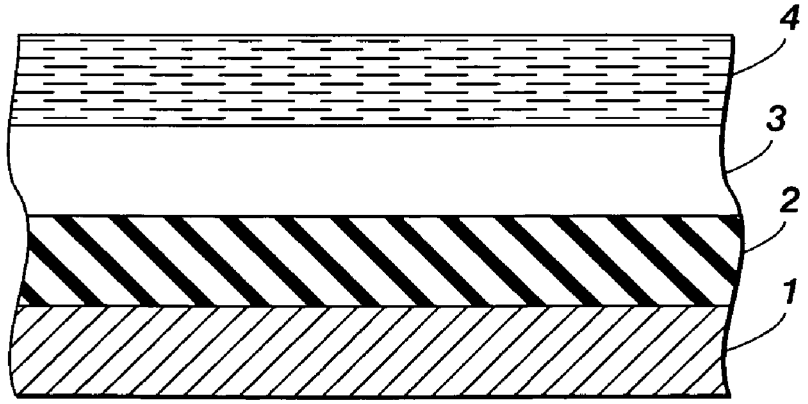
FIG. 2 is an enlarged, side view of an embodiment of a fuser member, showing a fuser member with a substrate, intermediate layer, outer layer, and release agent coating layer.

FIG. 2 is an enlarged schematic view of an embodiment of a fuser member, demonstrating the various possible layers. As shown in FIG. 2, substrate 1 has intermediate layer 2 thereon. Intermediate layer 2 can be, for example, a rubber such as silicone rubber or other suitable rubber material. On intermediate layer 2 is positioned outer layer 3. Positioned on outer layer 3 is outermost liquid fluorosilicone release layer 4.

Examples of the outer surface of the fuser system members include silicone, urethane, fluoroplastic or fluoropolymers, fluoroelastomers, or silicone-fluoropolymer hybrids. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of two of vinylidenefluoride, hexafluoropropylene, and tetrafluoroethylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer. These are known commercially under various designations as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly (propylene-tetrafluoroethylene) and FLUOREL II® (L11900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TH505®, available from Montedison Specialty Chemical Company.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

The amount of fluoroelastomer compound in solution in the outer layer solutions, in weight percent total solids, is from about 10 to about 25 percent, or from about 16 to about 22 percent by weight of total solids. Total solids as used herein include the amount of fluoroelastomer, dehydrofluorinating agent and optional adjuvants and fillers, including metal oxide fillers.

In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

An inorganic particulate filler may be used in connection with the fluoroelastomer outer layer, in order to provide anchoring sites for the functional groups of the silicone fuser agent. However, a filler is not necessary for use with the present fluorosilicone release agent. In fact, dispensing with a metal oxide increases fuser life and decreases fabrication costs. Examples of suitable fillers include a metal-containing filler, such as a metal, metal alloy, metal oxide, metal salt or other metal compound. The general classes of metals, which are applicable to the present invention include those metals of Groups 1b, 2a, 2b, 3a, 3b, 4a, 4b, 5a, 5b, 6b, 7b, 8 and the rare earth elements of the Periodic Table. The filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers are aluminum oxide and cupric oxide. Other examples include reinforcing and non-reinforcing calcined alumina and tabular alumina, respectively, along with nanoparticles. The size of the particle may be such that a low weight percent of loading into the polymer coating will provide a higher surface area of contact between the polymer and the filler, providing enhanced reinforcement or functionality.

The thickness of the outer fluoroelastomer surface layer of the fuser member herein is from about 10 to about 250 micrometers, or from about 15 to about 100 micrometers.

Optional intermediate adhesive layers and/or intermediate polymer or elastomer layers may be applied to achieve desired properties and performance objectives of the present invention. The intermediate layer may be present between the substrate and the outer fluoroelastomer surface. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

There may be provided an adhesive layer between the substrate and the intermediate layer. There may also be an adhesive layer between the intermediate layer and the outer layer. In the absence of an intermediate layer, the fluoroelastomer layer may be bonded to the substrate via an adhesive layer.

The thickness of the intermediate layer is from about 0.5 to about 20 mm, or from about 1 to about 7 mm.

The release agents or fusing oils described herein are provided onto the outer layer of the fuser member via a delivery mechanism such as a delivery roll. The delivery roll is partially immersed in a sump, which houses the fuser oil or release agent. The oil is renewable in that the release oil is housed in a holding sump and provided to the fuser roll when needed, optionally by way of a release agent donor roll in an amount of from about 0.1 to about 20 mg/copy, or from about 1 to about 12 mg/copy, or from about 1 to about 5 mg/copy. The later range encompasses most solid ink and lower oil levels in some fusing applications. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

Examples of suitable release agents include those having the following skeletal Formulas I or II:

$$CF_3-(CF_2CF_2)_m-O-(R_1R_2O)-(R_3R_3O)_n-(R_3O)_p-(CF_2)_q-CF_3 \quad \text{Formula I}$$

wherein $R_1$ is $CF_2$, $CF-CF_3$ or $-NHR_4$; $R_2$ is $CF_2$, $CF-CF_3$, or $-NR_4R_5$; and $R_3$ is $CF_2$ or $CF_3$, wherein $R_1$ is selected from the group consisting of $CF_2$, $CF-CF_3$ or $-NR_4R_5$; $R_2$ is selected from $CF_2$ or $CF-CF_3$; $R_3$ is $CF_2$ or $CF_3$; $R_4$ is selected from the group consisting of hydrogen, alkyl group having from about 1 to about 18 carbon atoms or from about 1 to about 8 carbons or from about 1 to about 6 carbons or from about 1 to about 3 carbon atoms, arylalkyl group (with either the alkyl group or the aryl group being attached to the silicon atom) having from about 7 to about 18 carbon atoms or from about 7 to about 9 carbon atoms, mercapto, hydride or carbinol functional group; $R_5$ is selected from the group consisting of alkyl having from about 1 to about 20 carbons or from about 1 to about 10 carbons such as methyl, ethyl, butyl and the like, and a fluoroalkyl having from about 2 to about 10 carbons such as fluoromethyl, fluorobutyl, difluoroethyl, and the like; m is a number of 0 or 1; n is a number of from about 0 to about 500, or from about 200 to about 350; p is a number of from about 0 to about 100 or from about 50 to about 75; q is a number of 0 or 1; and p+n is a number of from about 100 to about 500 or from about 250 to about 425; and $$R_1-(CF_2CF_2)_m-O-(R_2R_2O)_n-(R_2O)_p-(CF_2)_q-CF_2-R_1 \quad \text{Formula II}$$

wherein $R_1$ is $CF_3$; $R_2$ is selected from the group consisting of $CF_2$ and $CF-CF_3$; m is a number of 0 or 1; n is a number of from about 0 to about 500, or from about 200 to about 350; p is a number of from about 0 to about 100 or from about 50 to about 75; q is a number of 0 or 1; and p+n is a number of from about 100 to about 500 or from about 250 to about 425. The alkyl groups above can include including linear, branched, cyclic, and unsaturated alkyl groups.

In embodiments, the release agent has a viscosity of from about 75 to about 1,500 cS, or from about 100 to about 1,000 cS, when the release agent is used with toner. When the release agent is used with a phase change ink, the viscosities are from about 50 to about 200 cS, or from about 10 to about 40 cS.

Alternatively, a blend of functional silicone materials and nonfunctional perfluorinated polyether release agent can be used to combine the advantages of both individual fluids. In embodiments, a functional element can be added to the PFPE fluids in order to provide a replenishable, consistently uniform and non-interactive release fluid for use on variety of surfaces. In embodiments, the use of amine-functional PFPE fluids enables initial wetting performance and potentially sustained performance as this would also improve the wetting behavior of PFPE fluids so that they might wet areas of the fuser member that have been contaminated with toner. This should not, however, compromise the non-interactive nature of the PFPE fluid as the functional level would likely be very low in relation to the overall fluid composition. This concept should be applicable to other systems where a fluoroelastomer surface is used in conjunction with a release fluid and where there is a component of the toner or ink that is soluble in or capable of reacting with silicone oil. An example of such uses may be high-speed color fusing applications using EA (emulsion aggregation) toners (with or without wax) and other conventional fusers. The use of functional PFPE release fluids is promising in a wide variety of technologies as it could further reduce problematic side-reactions with toner, toner additives, paper debris, and the like elements that lead to early failure in marking subsystems.

In embodiments wherein a blend is used, the non-functional PFPE is used in an amount of from about 99 to about 60, or from about 90 to about 70 percent, or from 90 to about 80 percent by weight in combination with the functional fluorinated material. Similarly, the functional PFPE component is used in amounts of from about 1 to about 40 percent, or from about 10 to about 30 percent, or from about 10 to about 20 percent weight in combination with the non-functional PFPE material.

The combination of non-functional PFPE and functional PFPE fluid shows little interaction of the substituents to the copy substrate, such as paper. In this manner, the release agents do not prevent adhesives and POST IT® notes and other tabs from adhering adequately to copies or prints fused with these fluorinated release agents. In addition, the release agents spread better than known release agents on silicone rubber surfaces, and prevent swelling, which is a common problem. Moreover, the use of functional PFPE oils with non-functional PFPE oils reduces costs.

A nonfunctional oil, as used herein, refers to oils that do not interact or chemically react with the surface of the fuser member or with fillers on the surface. A functional oil, as used herein, refers to a release agent having functional groups, which chemically react with the fillers present on the surface of the fuser member or with the polymer itself, so as to reduce the surface energy of the fillers so as to provide better release of toner particles from the surface of the fuser member. If the surface energy is not reduced, the toner particles will tend to adhere to the fuser roll surface or to filler particles on the surface of the fuser roll, which will result in copy quality defects.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Functional Fluids

A perfluoropolyether fluid may be prepared or modified via several known synthetic methodologies in order to obtain pendant chemical structures relevant for enhancing the affinity of the fluid for various fuser member (or imaging member in the case of phase change ink) surfaces. The affinity between the functional pendant group may be obtained via polarity, charged ion or chemical bonding interactions. The desired chemical functional level in the concentrated fluid is from about 0.1 to about 2.0 mole percent. Lower values of from about 0.1 to about 0.5 mole percent fluids may not be diluted to functional levels desirable for the release agent application.

Example 2

Blended Fluid Composition

A prepared functional fluid concentrate fluid may be diluted with a non-functional fluid for the purpose of tailoring viscosity or functional level to a level appropriate for the intended application. Suitable blending fluids are sold under the trade names KRYTOX®, FOMBLIN®, GALDEN® or similarly available PFPE or fluorinated fluids. An example is a functional concentrated PFPE fluid of approximately 400 cS at 25° C. made to a functional level of 1.0 mole percent blended with a 10 cS at 25° C. non-functional PFPE fluid at a 1:9 ratio by weight. The resulting fluid has a viscosity of approximately 20 cS at 25° C. and a functional level of 0.1 mole percent.

Example 3

Functional PFPE Fluid Blend Use as Release Agent in Xerographic Fusing Application A fluid as fabricated in Examples 1 or 2 may be delivered to a fuser member or imaging member for the purpose of maintaining separation between a fuser surface in continuous and variable contact with toner or toner components and those toner or toner components during printing operation. This fluid can be delivered to the desired surface by several known methods for delivering release agents in printing, providing superior results than currently employed release agents.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A fuser member comprising a substrate;

an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a perfluorinated polyether having a skeleton selected from the group consisting of Formulas I and II, and mixtures thereof:

$$CF_3—(CF_2CF_2)_m—O—(R_1R_2O)—(R_3R_3O)_n—(R_3O)_p—(CF_2)_q—CF_3 \quad \text{Formula I}$$

wherein $R_1$ is selected from the group consisting of $CF_2$, $CF—CF_3$ and $—NR_4R_5$; $R_2$ is selected from the group consisting of $CF_2$, $CF—CF_3$, and $—NR_4R_5$; $R_3$ is selected from the group consisting of $CF_2$ and $CF_3$; $R_4$ is selected from the group consisting of hydrogen, alkyl group having from about 1 to about 18 carbon atoms, arylalkyl group having from about 7 to about 18 carbon atoms, mercapto, hydride and carbinol functional group; $R_5$ is selected from the group consisting of alkyl having from about 1 to about 20 carbons, and a fluoroalkyl having from about 2 to about 10 carbons; m is a number of 0 or 1; n is a number of from about 0 to about 500; p is a number of from about 0 to about 100; q is a number of 0 or 1, and p+n is from about 250 to about 425; and $$R_1—(CF_2CF_2)_m—O—(R_2R_2O)_n—(R_2O)_p—(CF_2)_q—CF_2—R_1 \quad \text{Formula II}$$

wherein $R_1$ is $CF_3$; $R_2$ is selected from the group consisting of $CF_2$ and $CF—CF_3$; m is a number of 0 or 1; n is a number of from about 0 to about 500; p is a number of from about 0 to about 100; q is a number of 0 or 1, and p+n is from about 250 to about 425.

2. A fuser member in accordance with claim 1, wherein said perfluorinated polyether is a functional perfluorinated polyether and has a skeleton having the following Formula I:

$$CF_3—(CF_2CF_2)_m—O—(R_1R_2O)—(R_3R_3O)_n—(R_3O)_p—(CF_2)_q—CF_3 \quad \text{Formula I}$$

wherein $R_1$ is selected from the group consisting of $CF_2$, $CF—CF_3$ and $NR_4R_5$; $R_2$ is selected from the group consisting of $CF_2$, $CF—CF_3$, and $—NR_4R_5$; $R_3$ is selected from the group consisting of $CF_2$ and $CF_3$; $R_4$ is selected from the group consisting of hydrogen, alkyl group having from about 1 to about 18 carbon atoms, arylalkyl group having from about 7 to about 18 carbon atoms, mercapto, hydride and carbinol functional group; $R_5$ is selected from the group consisting of alkyl having from about 1 to about 20 carbons, and a fluoroalkyl having from about 2 to about 10 carbons; m is a number of 0 or 1; n is a number of from about 0 to about 500; p is a number of from about 0 to about 100; q is a number of 0 or 1, and p+n is from about 250 to about 425.

3. A fuser member in accordance with claim 1, wherein said perfluorinated polyether is a nonfunctional perfluorinated polyether and has a skeleton having the following Formula II:

$$R_1—(CF_2CF_2)_m—O—(R_2R_2O)_n—(R_2O)_p—(CF_2)_q—CF_2—R_1 \quad \text{Formula II}$$

wherein $R_1$ is $CF_3$; $R_2$ is selected from the group consisting of $CF_2$ and $CF—CF_3$; m is a number of 0 or 1; n is a number of from about 0 to about 500; p is a number of from about 0 to about 100; q is a number of 0 or 1, and p+n is from about 250 to about 425.

4. A fuser member in accordance with claim 1, wherein said fluoroelastomer is a tetrapolymer of vinylidene fluoride, hexafluoropropylene, tetrafluoroethylene, and a cure site monomer.

5. A fuser member in accordance with claim 4, wherein the fluoroelastomer comprises about 35 weight percent of vinylidenefluoride, about 34 weight percent of hexafluoropropylene, about 29 weight percent of tetrafluoroethylene, and about 2 weight percent cure site monomer.

6. A fuser member in accordance with claim 1, wherein the release agent material coating has a viscosity of from about 75 to about 1,500 cS.

7. A fuser member in accordance with claim 6, wherein the release agent material coating has a viscosity of from about 200 to about 1,000 cS.

8. A fuser member in accordance with claim 3, wherein said release agent material coating further comprises a functional silicone blended with said nonfunctional perfluorinated polyether having a skeleton of Formula II.

9. A fuser member in accordance with claim 8, wherein said functional silicone is an amino-functional polydimethylsiloxane.

10. A fuser member in accordance with claim 8, wherein said functional silicone is present in said release agent material coating in an amount of from about 1 to about 40 percent by weight of said nonfunctional perfluorinated polyether.

11. A fuser member in accordance with claim 10, wherein said functional silicone is present in said release agent material coating in an amount of from about 10 to about 30 percent by weight of said nonfunctional perfluorinated polyether.

12. A fuser member in accordance with claim 1, further comprising an intermediate layer positioned between the substrate and the outer layer.

13. A fuser member in accordance with claim 12, wherein the intermediate layer comprises silicone rubber.

14. A fuser member in accordance with claim 1, wherein the fuser member substrate is in the form of a belt or a roller.

15. An image forming apparatus for forming images on a recording medium comprising:

a charge-retentive surface to receive an electrostatic latent image thereon;

a development component to apply a developer material to the charge-retentive surface to develop the electrostatic latent image to form a developed image on the charge retentive surface;

a transfer component to transfer the developed image from the charge retentive surface to a copy substrate; and a fuser member component to fuse the transferred developed image to the copy substrate, wherein the fuser member comprises a) a substrate; b) an outer layer comprising a fluoroelastomer selected from the group consisting of i) copolymers of two of vinylidene fluoride, hexafluoropropylene and tetrafluoroethylene; ii) terpolymers of vinylidene fluoride, hexafluoropropylene and tetrafluoroethylene; and iii) tetrapolymers of vinylidene fluoride, hexafluoropropylene, tetrafluoroethylene, and a cure site monomer; and a release agent material coating on the outer layer, wherein the release agent material coating comprises a perfluorinated polyether having a skeleton selected from the group consisting of Formulas I and II and mixtures thereof:

$$CF_3—(CF_2CF_2)_m—O—(R_1R_2O)—(R_3R_3O)_n—(R_3O)_p—(CF_2)_qCF_3 \quad \text{Formula I}$$

wherein $R_1$ is selected from the group consisting of $CF_2$, $CF—CF_3$ and $—NR_4R_5$; $R_2$ is selected from the group consisting of $CF_2$, $CF—CF_3$, and $—NR_4R_5$; $R_3$ is selected from the group consisting of $CF_2$ and $CF_3$; $R_4$ is selected from the group consisting of hydrogen, alkyl group having from about 1 to about 18 carbon atoms, arylalkyl group having from about 7 to about 18 carbon atoms, mercapto, hydride and carbinol functional group; $R_5$ is selected from the group consisting of alkyl having from about 1 to about 20 carbons, and a fluoroalkyl having from about 2 to about 10 carbons; m is a number of 0 or 1; n is a number of from about 0 to about 500; p is a number of from about 0 to about 100; q is a number of 0 or 1, and p+n is from about 250 to about 425; and $$R_1—(CF_2CF_2)_m—O—(R_2R_2O)_n—(R_2O)_p—(CF_2)_q—CF_2—R_1 \quad \text{Formula II}$$

wherein $R_1$ is $CF_3$; $R_2$ is selected from the group consisting of $CF_2$ and $CF—CF_3$; m is a number of 0 or 1; n is a number of from about 0 to about 500; p is a number of from about 0 to about 100; q is a number of 0 or 1, and p+n is from about 250 to about 425.

* * * * *